United States Patent
Yokoyama et al.

[11] Patent Number: 5,952,410
[45] Date of Patent: Sep. 14, 1999

[54] POLYACETAL RESIN COMPOSITION EXHIBITING HIGH RETENTIVITY OF MECHANICAL STRENGTHS

[75] Inventors: Hiroshi Yokoyama, Kurashiki; Hideyuki Ariyasu, Fujisawa; Hajime Nagahara, Kurashiki, all of Japan

[73] Assignee: Asahi Kasei Kogyo Kabushiki Kaisha, Osaka, Japan

[21] Appl. No.: 09/011,382

[22] PCT Filed: Sep. 5, 1996

[86] PCT No.: PCT/JP96/02512

§ 371 Date: Jan. 9, 1998

§ 102(e) Date: Jan. 9, 1998

[87] PCT Pub. No.: WO97/09382

PCT Pub. Date: Mar. 13, 1997

[30] Foreign Application Priority Data

Sep. 6, 1995 [JP] Japan ................................ 7-228702
Sep. 8, 1995 [JP] Japan ................................ 7-230924

[51] Int. Cl.[6] ............................ C08L 59/00; C08K 5/20; B29C 45/00; B29C 45/14
[52] U.S. Cl. ..................... 524/210; 524/212; 524/227; 524/230; 524/231; 428/411; 264/241; 264/259; 264/271.1; 264/272.11; 264/279; 264/279.1
[58] Field of Search ...................... 524/210, 212, 524/227, 230, 231; 428/411; 264/241, 259, 271.1, 272.11, 279, 279.1

[56] References Cited

U.S. PATENT DOCUMENTS 4,382,994  5/1983  Matsumi ................................ 428/411

FOREIGN PATENT DOCUMENTS 62-280253  12/1987  Japan .
7-124996   5/1995   Japan .
7-124997   5/1995   Japan .
7-126481   5/1995   Japan .
8-157688   6/1996   Japan .
8-207703   8/1996   Japan .

Primary Examiner—Nathan M. Nutter

[57] ABSTRACT

Disclosed is a polyacetal resin composition comprising 100 parts by weight of polyacetal resin having a melting temperature of from 150 to 161° C.; 0.01 to 5.0 parts by weight of at least one bisamide compound of formula (1)

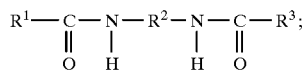

and 0.0001 to 5.0 parts by weight of at least monoamide compound of formula (2)

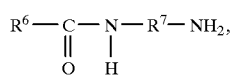

in which formulae (1) and (2) each of $R^1$, $R^3$ and $R^6$ independently is an alkyl or an alkenyl, and $R^2$ and $R^7$ independently is an alkylene, an alkenylene, or —$R^4$—Ph—$R^5$— (each of $R^4$ and $R^5$ independently is a single bond or a methylene, and Ph is a phenylene). The resin composition of the present invention has excellent mechanical strength retentivity during cooling-heating cycles. For example, not only occurrence of whitening, crazing or cracking but also lowering in impact resistance can be suppressed even after the resin composition experiences repeated cooling-heating cycles. Thus, the resin composition of the present invention can be advantageously used in various applications where repeated heating-cooling cycles are necessarily experienced. Also, disclosed is an insert molded article comprising the above-mentioned resin composition and a shaped part unified with the resin composition by insert molding, which article exhibits excellent cooling-heating cycle resistance with respect to the mechanical strength.

6 Claims, 1 Drawing Sheet

POLYACETAL RESIN COMPOSITION EXHIBITING HIGH RETENTIVITY OF MECHANICAL STRENGTHS

This application is filed under 35 USC 371 of PCT/JP 96/02512, filed Sep. 5, 1996, and claims priority thereto.

BACKGROUND OF THE INVENTION

1. Field of The Invention

The present invention relates to a polyacetal resin composition and an insert molded article comprising the same. More particularly, the present invention is concerned with a polyacetal resin composition having high mechanical strength retentivity, which comprises a polyacetal resin having a specific, relatively low melting temperature, a specific bisamide in a specific amount and a specific monoamide in a specific amount, and is also concerned with an insert molded article comprising the same.

The polyacetal resin composition of the present invention has excellent weatherability, specifically resistance to cooling-heating cycles (hereinafter, frequently referred to simply as "cooling-heating cycle resistance"), i.e., mechanical strength retentivity during cooling-heating cycles. For example, in the polyacetal resin composition of the present invention, not only the occurrence of whitening, crazing or cracking but also the lowering in impact resistance can be suppressed even after the polyacetal resin composition experiences repeated cooling-heating cycles.

The polyacetal resin composition of the present invention exhibits excellent cooling-heating cycle resistance with respect to the mechanical strength and, therefore, can be advantageously used in various applications where repeated heating-cooling cycles are necessarily experienced and where, hence, use of conventional polyacetal resins has been restricted. Therefore, the polyacetal resin composition of the present invention can be advantageously used as material for parts in various industrial fields. Also, an insert molded article comprising the above-mentioned polyacetal resin composition and a shaped part unified with the resin composition by insert molding, exhibits excellent cooling-heating cycle resistance with respect to the mechanical strength, so that, even after the insert molded article experiences repeated cooling-heating cycles, it does not suffer either appearance deterioration, such as whitening due to fine crazing, or a lowering in impact resistance. Thus, the insert molded article of the present invention can be used for a prolonged period of time, without suffering crazing or cracking.

BACKGROUND ART

Insert molding methods which have conventionally been used for producing insert molded articles, in which a resin (plastic) segment is unified with a metallic segment (i.e., insert), can be roughly classified into the following two modes: (1) a mode in which, for the purpose of reinforcing a resin molded article, insert molding is conducted so as to embed a metallic segment, such as a shaft, nut or sleeve, in a resin article; and (2) a mode in which, for the purpose of avoiding cumbersome operations in producing a metal-resin composite article, which operations involve producing a plurality of parts [i.e., metallic part(s) and resin part(s)] separately and then assembling the separately produced parts, molding is conducted so as to produce a metal-resin composite article (other than a metal-embedded article) by a one-time molding operation (in which article a resin part, such as a pin or a bushing, and a metallic part or substrate are combined in a unified form) (this second mode is also frequently called "outsert molding") (see for example, Unexamined Japanese Patent Application Laid-Open Specification No. 7-124997)]. The above-mentioned insert molding has been widely used for manufacturing parts of various electrical appliances and automobiles.

Conventionally, as a thermoplastic resin to be used in the insert molding, a polyacetal resin has been advantageously used since the polyacetal resin has excellent mechanical strength, electrical characteristics, chemical resistance and sliding properties.

However, insert molded articles produced using a conventional polyacetal resin have serious disadvantages. For example, when insert molded articles are used as parts of electrical appliances, parts of automobiles or the like, which parts frequently experience repeated cooling-heating cycles during use thereof, the resin segments of the insert molded articles are likely to suffer whitening around the joint portions of the metallic segments and the resin segments, and occasionally suffer crazing or, in extreme case, cracking when the articles sustain an impact. Therefore, use of the insert molded articles produced using conventional polyacetal resins is extremely limited.

The above-mentioned disadvantages are due to the creep rupture of the resin segment of the insert molded article, resulting from molding strains occurring in the resin segment of the insert molded article. The period for a creep rupture to occur varies, depending on the stress caused by the molding strain, the ambient temperature and the like, and the period becomes shorter especially when the molded article is used in a high temperature atmosphere. A creep rupture may also occur due to the presence of various defects in the resin segment: for example, flashes, voids and a trace of a pressed knockout pin; contaminants and by-products which are caused by not only incorporation of inappropriate additives but also decomposition of resin and additives; and stains caused by smudges of the mold. Around the portions having the above-mentioned defects in the resin segment, stress is likely to be concentrated, so that these portions are likely to be the starting points for creep rupture.

For the purpose of preventing occurrence of whitening, crazing and cracking in an insert molded article, Unexamined Japanese Patent Application Laid-Open Specification Nos. 7-124996 and 7-124997 disclose a method in which a specific polyacetal copolymer is used to suppress shrinkage caused during production and post-heating the insert molded product. However, the above-mentioned method is not satisfactory to suppress occurrence of whitening, crazing or cracking and lowering in impact resistance of the polyacetal copolymer, especially when the polyacetal copolymer experiences repeated cooling-heating cycles. In the above-mentioned specifications, there is no description about the incorporation of a specific additive into the polyacetal copolymer for solving the above-mentioned problems.

SUMMARY OF THE INVENTION

In these situations, the present inventors have made extensive and intensive studies with a view toward solving the above-mentioned problems accompanying the conventional polyacetal resins. As a result, it has unexpectedly been found that a polyacetal resin composition, which comprises a polyacetal resin having a specific, relatively low melting temperature, a specific bisamide in a specific amount and a specific monoamide in a specific amount has excellent cooling-heating cycle resistance with respect to the mechanical strength, i.e., mechanical strength retentivity during cooling-heating cycles. The present invention has been completed, based on the above finding.

Therefore, it is an object of the present invention to provide a polyacetal resin composition having high mechanical strength retentivity during cooling-heating cycles.

It is another object of the present invention to provide an insert molded article, produced using the above polyacetal resin composition, having high mechanical strength retentivity during cooling-heating cycles.

The foregoing and other objects, features and advantages of the present invention will be apparent to those skilled in the art from the following detailed description and appended claims taken in connection with the accompanying drawing.

DESCRIPTION OF REFERENCE NUMERALS

Figure 1:
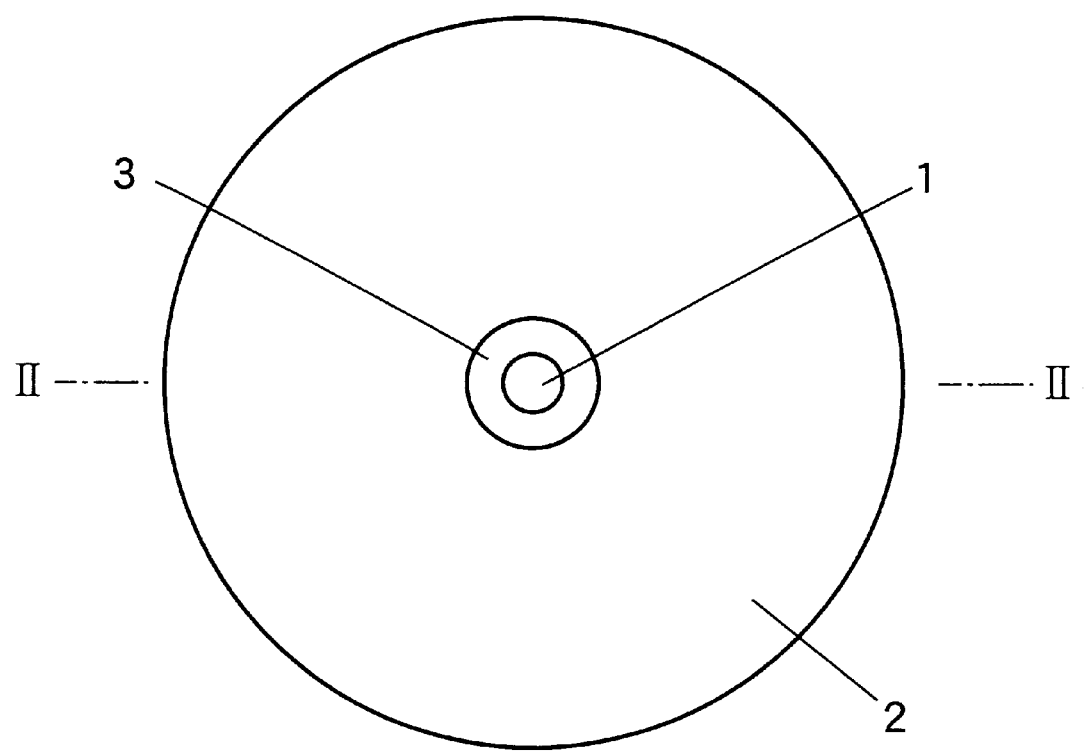
FIG. 1 is a diagrammatic plan view of an insert molded article prepared in the Examples and Comparative Examples described below.
Figure 2:
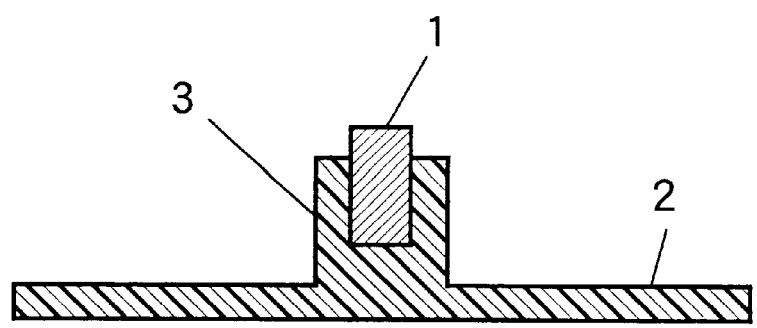
FIG. 2 is a diagrammatic vertical cross-sectional view of FIG. 1, taken along line II—II thereof.

In FIG. 1 and FIG. 2, the reference numerals designate the following parts and portions.

1: Insert (metallic segment)
2: Polyacetal resin
3: Boss

DETAILED DESCRIPTION OF THE INVENTION

According to the present invention, there is provided a polyacetal resin composition comprising:

100 parts by weight of a polyacetal resin having a melting temperature of from 150 to 161° C., 0.01 to 5.0 parts by weight, relative to 100 parts by weight of the polyacetal resin, of at least one bisamide compound represented by the following formula (1):

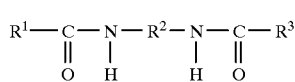

wherein each of $R^1$ and $R^3$ independently represents a $C_1$–$C_{30}$ alkyl group or a $C_2$–$C_{30}$ alkenyl group, and $R^2$ represents a $C_2$–$C_{10}$ alkylene group, a $C_2$–$C_{10}$ alkenylene group, or a group represented by formula —$R^4$—Ph—$R^5$—, wherein each of $R^4$ and $R^5$ independently represents a single bond or a methylene group, and Ph represents a phenylene group, and 0.0001 to 5.0 parts by weight, relative to 100 parts by weight of the polyacetal resin, of at least one monoamide compound represented by the following formula (2):

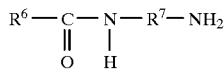

wherein $R^6$ represents a $C_1$–$C_{30}$ alkyl group or a $C_2$–$C_{30}$ alkenyl group, and $R^7$ represents a $C_2$–$C_{10}$ alkylene group, a $C_2$–$C_{10}$ alkenylene group, or a group represented by formula —$R^8$—Ph—$R^9$—, wherein each of $R^8$ and $R^9$ independently represents a single bond or a methylene group, and Ph represents a phenylene group.

For easy understanding of the present invention, the essential features and various embodiments of the present invention are enumerated below.

1. A polyacetal resin composition comprising:
   100 parts by weight of a polyacetal resin having a melting temperature of from 150 to 161° C.,
   0.01 to 5.0 parts by weight, relative to 100 parts by weight of the polyacetal resin, of at least one bisamide compound represented by the following formula (1):

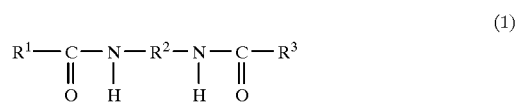

wherein each of $R^1$ and $R^3$ independently represents a $C_1$–$C_{30}$ alkyl group or a $C_2$–$C_{30}$ alkenyl group, and $R^2$ represents a $C_2$–$C_{10}$ alkylene group, a $C_2$–$C_{10}$ alkenylene group, or a group represented by formula —$R^4$—Ph—$R^5$—, wherein each of $R^4$ and $R^5$ independently represents a single bond or a methylene group, and Ph represents a phenylene group, and 0.0001 to 5.0 parts by weight, relative to 100 parts by weight of the polyacetal resin, of at least one monoamide compound represented by the following formula (2):

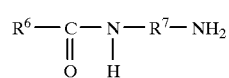

wherein $R^6$ represents a $C_1$–$C_{30}$ alkyl group or a $C_2$–$C_{30}$ alkenyl group, and $R^7$ represents a $C_2$–$C_{10}$ alkylene group, a $C_2$–$C_{10}$ alkenylene group, or a group represented by formula —$R^8$—Ph—$R^9$—, wherein each of $R^8$ and $R^9$ independently represents a single bond or a methylene group, and Ph represents a phenylene group.

2. The resin composition according to item 1 above, which further comprises 0.01 to 5.0 parts by weight, relative to 100 parts by weight of the polyacetal resin, of at least one hindered phenol compound.

3. The resin composition according to item 1 or 2 above, which further comprises 0.01 to 5.0 parts by weight, relative to 100 parts by weight of the polyacetal resin, of at least one hindered amine compound.

4. The resin composition according to any one of items 1 to 3 above, which further comprises 0.01 to 5.0 parts by weight, relative to 100 parts by weight of the polyacetal resin, of at least one compound selected from the group consisting of benzotriazole compounds and oxalic anilide compounds.

5. The resin composition according to item 4 above, which further comprises 0.01 to 3.0 parts by weight, relative to 100 parts by weight of the polyacetal resin, of at least one polyalkylene glycol represented by the following formula (3):

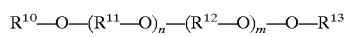

wherein each of $R^{10}$ and $R^{13}$ independently represents a hydrogen atom, a $C_1$–$C_{30}$ alkyl group, a $C_2$–$C_{30}$ alkenyl group, a $C_1$–$C_{30}$ acyl group or a $C_7$–$C_{30}$ alkylphenyl group, each of $R^{11}$ and $R^{12}$ independently represents a $C_2$–$C_6$ alkylene group, and each of n and m independently represents an integer of 1 or more with the proviso that n+m<1,000.

6. An insert molded article comprising a polyacetal resin composition according to any one of items 1 to 5 above, and a shaped part unified with the resin composition by insert molding.

With respect to the polyacetal resin composition of the present invention, and the insert molded article comprising the polyacetal resin composition and a shaped part unified with the resin composition by insert molding, explanation is made below in more detail.

In the present invention, the term "insert molding" means not only the above-mentioned molding for embedding a metallic part in a resin but also the above-mentioned so-called outsert molding.

Also, in the present invention, the term "whitening" means a state of the resin, wherein fine crazings occur so that the resin looks hazy, and the term "cracking" means a state of the resin, wherein relatively large crazing occurs. Hereinafter, the phenomena "whitening", "crazing" and "cracking" are frequently, collectively referred to as "cracking".

The polyacetal resins contained in the polyacetal resin compositions of the present invention include, for example, an oxymethylene-oxyalkylene random copolymer comprising recurring oxymethylene units and $C_2$–$C_8$ oxyalkylene units inserted in the oxymethylene units at random, which is obtained by copolymerizing a cyclic oligomer, such as a trimer of formaldehyde (trioxane) or a tetramer of formaldehyde (tetraoxane), with a cyclic ether, such as ethylene oxide, propylene oxide, 1,3-dioxolane, glycol formal and diethylene glycol formal; a modified form of the above-mentioned oxymethylene-oxyalkylene random copolymer, wherein a crosslinkage or a blanched molecular structure chain is incorporated; and a block copolymer comprising a segment consisting of recurring oxymethylene units and a segment consisting of recurring units other than oxymethylene units, such as a segment consisting of, e.g., recurring oxyethylene units, recurring oxypropylene units, recurring methylene units, recurring propylene units or the like. In all of the above copolymer, the terminal oxymethylene residues are blocked by etherification, esterification or the like.

In the present invention, it is essential that the polyacetal resin have a melting temperature of from 150 to 161° C. The melting temperature is preferably from 151 to 160° C., more preferably from 155 to 160° C. The polyacetal resin having a melting temperature of lower than 150° C. exhibits poor mechanical strength. On the other hand, the polyacetal resin having a melting point of higher than 161° C. exhibits poor toughness, so that the cooling-heating cycle resistance with respect to mechanical strength becomes poor. More illustratively stated, when an insert molded article is produced from the polyacetal resin having a melting temperature of higher than 161° C., not only cannot occurrence of molding strains at the joint of a metal segment and a resin segment in the insert molded article be effectively suppressed, but also the insert molded article is likely to suffer marked post-shrinkage when heated, which leads to occurrence of cracking.

The melting temperature of the polyacetal resin of the present invention is lower than the melting temperature (which is generally from 162 to 175° C.) of commercially available polyacetal resins. A polyacetal resin having a lower melting temperature than that of commercially available polyacetal resins can be obtained, for example, by increasing the content of oxyalkylene units in the oxymethylene-oxyalkylene copolymer chain of the polyacetal resin, or by introducing oxyalkylene units each having at least 3 carbon atoms (which are derived from, e.g., propylene oxide, 1,4-butanediol formal) to the oxymethylene-oxyalkylene copolymer chain. Particularly, a polyacetal resin having a relatively low melting temperature can be most effectively obtained by increasing the content of oxyethylene units (which are derived from, e.g., 1,3-dioxolane), or by increasing the content of oxypropylene units (which are derived from propylene oxide) in the oxymethylene-oxyalkylene copolymer chain.

For example, when the polyacetal resin is an oxymethylene-oxyethylene copolymer containing oxyethylene groups in an amount of from 1.5 to 7.0 mol %, preferably from 1.7 to 7.0 mol %, based on the molar total of the oxymethylene units, the polyacetal resin has a relatively low melting temperature. Also, the polyacetal resin can have a relatively low melting temperature when the polyacetal resin is an oxymethylene-oxypropylene copolymer containing oxypropylene groups in an amount of from 1.2 to 5.6 mol %, based on the molar total of the oxymethylene units, or is an oxymethylene-oxybutylene copolymer containing oxybutylene groups in an amount of from 0.9 to 4.3 mol %, based on the molar total of the oxymethylene units.

Specifically, a polyacetal resin having a relatively lower melting temperature can be obtained by conducting a bulk polymerization of trioxane and 1,3-dioxolane (which is used in an amount of from 5.0 to 22.0 mol %, based on the molar amount of trioxane) in the presence of methylal as a molecular weight modifier and boron trifluoride dibutyl ether as a catalyst (which are respectively employed in an amount of from 0.05 to 0.1 mol %, and in an amount of from 0.0005 to 0.002 mol %, each based on the molar amount of trioxane).

From the viewpoint of achieving excellent molding properties, it is preferred that the melt index of the polyacetal resin be from 0.1 to 100 g/10 min, more preferably from 0.1 to 50 g/10 min, still more preferably from 0.1 to 9 g/10 min, as measured in accordance with ASTM-D1238-57 Condition E test.

In the polyacetal resin composition of the present invention, at least one bisamide compound contained therein is represented by the following formula (1):

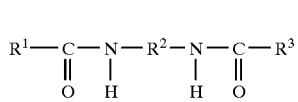

(1)

wherein each of $R^1$ and $R^3$ independently represents a $C_1$–$C_{30}$ alkyl group or a $C_2$–$C_{30}$ alkenyl group, and $R^2$ represents a $C_2$–$C_{10}$ alkylene group, a $C_2$–$C_{10}$ alkenylene group, or a group represented by formula —$R^4$—Ph—$R^5$—, wherein each of $R^4$ and $R^5$ independently represents a single bond or a methylene group, and Ph represents a phenylene group.

Examples of bisamide compounds represented by formula (1) include:
N,N'-ethylene bislauramide,
N,N'-ethylene bisstearamide,
N,N'-ethylene bisoleamide, N,N'-ethylene biserucamide,
N,N'-xylylene biserucamide,
N,N'-hexamethylene bisstearamide,
N,N'-ethylene lauric-stearic-bisamide,
N,N'-ethylene lauric-oleic-bisamide,
N,N'-ethylene erucic-lauric-bisamide,
N,N'-ethylene oleic-stearic-bisamide,
N,N'-ethylene erucic-stearic-bisamide, and
N,N'-ethylene erucic-oleic-bisamide.

Among these compounds, N,N'-ethylene bislauramide, N,N'-ethylene bisstearamide and N,N'-ethylene bisoleamide are preferred.

In the polyacetal resin composition of the present invention, the amount of at least one bisamide compound represented by formula (1) is from 0.01 to 5.0 parts by weight, preferably from 0.05 to 2.0 parts by weight, relative to 100 parts by weight of the polyacetal resin. When the amount of bisamide compound is less than 0.01 part by weight, an intended improvement in the cooling-heating cycle resistance of the polyacetal resin composition with respect to mechanical strength, especially of an ultimate molded article, cannot be achieved. On the other hand, when the amount of bisamide compound is more than 5.0 parts by weight, the cooling-heating cycle resistance of the ultimate molded article is rather decreased.

In the polyacetal resin composition of the present invention, at least one monoamide compound contained therein is represented by the following formula (2):

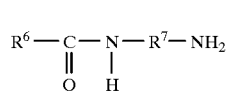

(2)

wherein $R^6$ represents a $C_1$–$C_{30}$ alkyl group or a $C_2$–$C_{30}$ alkenyl group, and $R^7$ represents a $C_2$–$C_{10}$ alkylene group, a $C_2$–$C_{10}$ alkenylene group, or a group represented by formula —$R^8$—Ph—$R^9$—, wherein each of $R^8$ and $R^9$ independently represents a single bond or a methylene group, and Ph represents a phenylene group.

Examples of monoamide compounds represented by formula (2) include N,N'-ethylene amine lauramide, N,N'-ethylene amine stearamide, N,N'-ethylene amine oleamide, N,N'-ethylene amine erucamide, N,N'-xylylene amine erucamide and N,N'-hexamethylene amine stearamide. Among these compounds, N,N'-ethylene amine lauramide, N,N'-ethylene amine stearamide and N,N'-ethylene amine oleamide are preferred.

In the polyacetal resin composition of the present invention, the amount of at least one monoamide compound represented by formula (2) is from 0.0001 to 5.0 parts by weight, preferably from 0.0005 to 2.0 parts by weight, relative to 100 parts by weight of the polyacetal resin. When the amount of monoamide compound represented by formula (2) is less than 0.0001 part by weight, an intended improvement in the cooling-heating cycle resistance cannot be achieved. On the other hand, when the amount of amide compound represented by formula (2) is more than 5.0 parts by weight, the cooling-heating cycle resistance is rather decreased.

From the viewpoint of suppressing not only the occurrence of surface defects of the ultimate molded article but also the occurrence of by-products (e.g., thermal decomposition products and oxidation products of the polyacetal resin and additives), it is also preferred that the polyacetal resin composition of the present invention further comprise at least one hindered phenol compound as a thermal stabilizer. Examples of hindered phenol compounds include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], pentaerythrithyl-tetrakis[3(3,5,-di-t-butyl-4-hydroxyphenyl)propionate], N,N'-hexamethylene-bis(3,5-di-t-butyl-4-hydroxyhydrocinnamamide), 2-t-butyl-6-(3'-t-butyl-5'-methyl-2'-hydroxybenzyl)-4-methylphenylacrylate, 3,9-bis{2-[3-(3-t-butyl-4-hydroxy-5-methylphenyl)propionyloxy]1,1-dimethylethyl}-2,4,8,10-tetraoxaspiro(5,5)undecane, 2,2-methylene-bis(4-methyl-6-t-butylphenol), N,N'-bis[3-(3,5-di-t-butyl-4-hydroxyphenyl)propionyl] hydrazine. Among these compounds, triethylene glycol-bis [3-(3-t-butyl-5-methyl-4-hydroxyphenyl)propionate] and pentaerythrithyl-tetrakis[3-(3,5-di-t-butyl-4-hydroxyphenyl)propionate] are preferred.

It is preferred that the amount of hindered phenol compound be from 0.01 to 5.0 parts by weight, more preferably from 0.05 to 2.0 parts by weight, relative to 100 parts by weight of the polyacetal resin. When the amount of hindered phenol compound is in the above-mentioned range, the cooling-heating cycle resistance of the ultimate molded article with respect to mechanical strength is remarkably improved. When the amount of hindered phenol is less than 0.01 part by weight, an intended further improvement in cooling-heating cycle resistance cannot be achieved. On the other hand, when the amount of hindered phenol is more than 5.0 parts by weight, the cooling-heating cycle resistance of the ultimate molded article is rather decreased.

From the viewpoint of suppressing not only the occurrence of surface defects of the ultimate molded article but also the occurrence of by-products (e.g., thermal decomposition products and oxidation products of the polyacetal resin and additives), it is also preferred that the polyacetal resin composition of the present invention further comprise at least one hindered amine compound as a stabilizer. Examples of hindered amine compounds include:
bis(2,2,6,6-tetramethyl-4-piperidyl)-sebacate,
bis(2,2,6,6-tetramethyl-4-piperidyl)-adipate,
4-benzoyloxy-2,2,6,6-tetramethylpiperidine,
4-(phenylcarbamoyloxy)-2,2,6,6-tetramethylpiperidine,
and a condensation product between 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5) undecane]diethanol, which condensation product is represented by the following formula (4):

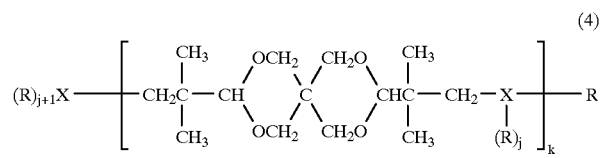

(4)

wherein j represents an integer of from 1 to 4, k represents an integer of from 1 to 10, R is a piperidine derivative represented by the following formula:

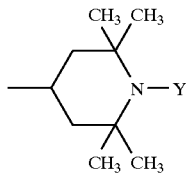

wherein Y represents a hydrogen atom, a hydroxyl group, a $C_1$–$C_8$ alkyl group or a $C_1$–$C_8$ acyl group, and X is a group represented by the following formula:

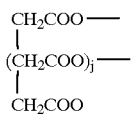

wherein j is as defined above.

Among these hindered amine compounds, bis(2,2,6,6-tetramethyl-4-piperidyl)-sebacate, and a condensation product between 1,2,3,4-butane tetracarboxylic acid, 1,2,2,6,6-pentamethyl-4-piperidinol and β, β, β', β'-tetramethyl-3,9-[2,4,8,10-tetraoxaspiro(5,5)undecane]-diethanol are preferred. Especially preferred is a combination thereof.

It is preferred that the amount of hindered amine compound be from 0.01 to 5.0 parts by weight, more preferably from 0.05 to 3.0 parts by weight, relative to 100 parts by weight of the polyacetal resin. When the amount of hindered amine compound is in the above-mentioned range, the cooling-heating cycle resistance of the ultimate molded article with respect to mechanical strength is remarkably improved. When the amount of hindered amine compound is less than 0.01 part by weight, an intended further improvement in the cooling-heating cycle resistance cannot be achieved. When the amount of hindered amine compound is more than 5.0 parts by weight, an intended further improvement in the cooling-heating cycle resistance of the ultimate molded article cannot be achieved as well, resulting in economic disadvantages.

From the viewpoint of suppressing not only the occurrence of surface defects of the ultimate molded article but also the occurrence of by-products (e.g., thermal decomposition products and oxidation products of the polyacetal resin and additives), it is also preferred that the polyacetal resin composition of the present invention further comprise at least one compound selected from the group consisting of benzotriazole compounds and oxalic anilide compounds as a stabilizer. Examples of benzotriazole compounds include: 2-(2'-hydroxy-5'-methyl-phenyl)benzotriazole, 2-(2'-hydroxy-3',5'-di-t-butyl-phenyl)benzotriazole, 2-(2'-hydroxy-3',5'-di-isoamyl-phenyl)benzotriazole, 2-[2'-hydroxy-3',5'-bis-(α,α-dimethylbenzyl)phenyl]-benzotriazole, and 2-(2'-hydroxy-4'-octoxyphenyl)-benzotriazole.

Examples of oxalic anilide compounds include: 2-ethoxy-2'-ethyl oxalic acid bisanilide, 2-ethoxy-5-t-butyl-2'-ethyl oxalic acid bisanlide, and 2-ethoxy-3'-dodecyl oxalic acid bisanilide.

It is preferred that the amount of at least one compound selected from benzotriazole compounds and oxalic anilide compounds be from 0.01 to 5.0 parts by weight, more preferably from 0.05 to 3.0 parts by weight, relative to 100 parts by weight of the polyacetal resin. When the amount of the above-mentioned compound is in the above-mentioned range, the cooling-heating cycle resistance of the ultimate molded article with respect to mechanical strength is remarkably improved. When the amount of the above-mentioned compound is less than 0.01 part by weight, an intended further improvement in the cooling-heating cycle resistance cannot be achieved. On the other hand, when the amount of the above-mentioned compound is more than 5.0 parts by weight, a problem rather arises in that the ultimate molded article suffers from bleeding and blobbing, so that the appearance of the article is deteriorated.

From the viewpoint of not only imparting toughness to the ultimate molded article but also suppressing the occurrence of defects, such as cracking, in the ultimate molded article, it is also preferred that the polyacetal resin composition of the present invention further comprise at least one polyalkylene glycol represented by the following formula (3):

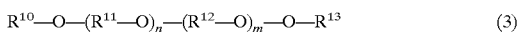

wherein each of $R^{10}$ and $R^{13}$ independently represents a hydrogen atom, a $C_1$–$C_{30}$ alkyl group, a $C_2$–$C_{30}$ alkenyl group, a $C_1$–$C_{30}$ acyl group or a $C_7$–$C_{30}$ alkylphenyl group, each of $R^{11}$ and $R^{12}$ independently represents a $C_2$–$C_6$ alkylene group, and each of n and m independently represents an integer of 1 or more with the proviso that n+m<1,000.

Examples of polyalkylene glycols represented by formula (3) include polyethylene glycol (wherein the average number of moles of ethylene oxide is from 5 to 1,000), polypropylene glycol (wherein the average number of moles of propylene oxide is from 5 to 1,000), polyethylene glycol oleylether (wherein the average number of moles of ethylene oxide is from 5 to 50), polyethylene glycol cetylether (wherein the average number of moles of ethylene oxide is from 5 to 20), polyethylene glycol stearylether (wherein the average number of moles of ethylene oxide is from 5 to 30), polyethylene glycol laurylether (wherein the average number of moles of ethylene oxide is from 5 to 30), polyethylene glycol decylether (wherein the average number of moles of ethylene oxide is from 5 to 30), polyethylene glycol nonylphenylether (wherein the average number of moles of ethylene oxide is from 2 to 100), polyethylene glycol octylphenylether (wherein the average number of moles of ethylene oxide is from 4 to 50), polyethylene glycol monolaurate (wherein the average number of moles of ethylene oxide is from 2 to 30), polyethylene glycol monostearate (wherein the average number of moles of ethylene oxide is from 2 to 50) and polyethylene glycolpolypropylene glycol block polymer (average molecular weight: 1,000 to 10,000).

It is preferred that the amount of polyalkylene glycol represented by formula (3) be from 0.01 to 3.0 parts by weight, more preferably from 0.02 to 2.0 parts by weight, relative to 100 parts by weight of the polyacetal resin. When the amount of polyalkylene glycol is in the above-mentioned range, the cooling-heating cycle resistance of the ultimate molded article with respect to mechanical strength is remarkably improved. When the amount of polyalkylene glycol is less than 0.01 part by weight, an intended further improvement in the cooling-heating cycle resistance cannot be achieved. When the amount of polyalkylene glycols is more than 3.0 parts by weight, an intended further improvement in the cooling-heating cycle resistance of the ultimate molded article cannot be achieved as well, resulting in economic disadvantages.

The polyacetal resin composition of the present invention not only maintains the excellent inherent properties of a polyacetal resin, but also exhibits excellent resistance to repeated large changes in environmental temperature, i.e., so-called cooling-heating cycles. Therefore, the polyacetal composition of the present invention can be advantageously used as materials for producing mechanical parts and exterior parts for automobiles, electric and electronic equipments, and other industrial apparatuses. Preferred examples of such parts include an alternator terminal, an alternator connector, an IC regulator, a potentiometer base, a wide variety of valves, such as a valve relating to fuel, a valve relating to exhaust system (e.g. an exhaust gas valve) and a valve relating to air intake system, an air intake nozzle snorkel, an intake manifold, a fuel pump, a joint for engine cooling water circulation pipes, a carburetor main body, an exhaust gas sensor, a cooling water sensor, an oil temperature sensor, a brake friction pad wear sensor, a slot position sensor, a crankshaft position sensor, an air flow sensor, a thermostat base for an air conditioner, a heated-air flow control valve for a fan heater, a brush holder used in a motor for a radiator, a water pump impeller, a wiper motor-related part, a distributor, a starter switch, a starter relay, a wire harness for an automobile transmission, an air conditioner switch panel base board, a coil for a fuel-related electromagnetic valve, a connector for a fuse, a horn terminal, an insulation plate for electric power transmission parts, a step motor rotor, a lamp housing, a break piston, a solenoid bobbin, an engine oil filter, a casing for an ignition device, a radiator drain cock, a diaphragm valve, an automatic antenna gear case, a door lock, a winker case, a wiper gear, a wiper pivot bearing, a window glass bottom channel, a seat belt housing, a seat belt retractor part, a heater control lever, an inside door handle, a regulator handle, an outer door handle, a sun visor bracket, a seat hook, a fender mirror case, a fuel cap, a window washer nozzle, and other automobile components and automobile-related components.

Further, an insert molded article which is excellent in cooling-heating cycle resistance with respect to the mechanical strength can be obtained, using the polyacetal composition of the present invention, by insert molding, in which a shaped part comprised mainly of a metal, such as copper, brass and aluminum, is inserted in the cavity of a mold, and injection molding of a resin is conducted using the mold, to obtain an insert molded article in which the metallic part is unified with the resin.

Specifically, when the polyacetal resin composition of the present invention is used for producing an insert molded article in which a metallic part is embedded in a resin, various insert molded articles (e.g., a toothed wheel) having the excellent properties of the polyacetal resin composition of the present invention can be obtained. Examples of embedded metallic parts include shaped parts, such as a metallic screw, metallic bearing, metallic shaft and the like. Further, when the polyacetal resin composition of the present invention is used for producing metal-resin composite articles by the so-called outsert molding, various excellent outsert molded articles can be obtained. Examples of such outsert molded articles include a VTR chassis in which a metallic perforated substrate obtained by punching is combined with various functional resin parts, which are all unified with the metallic perforated plate.

The mechanism for the composition of the present invention to exhibit the above-mentioned excellent properties has not yet been elucidated. However, it is presumed that the polyacetal resin having a melting temperature of from 150° C. to 161° C. can very uniformly disperse therein the bisamide compound of formula (1) and the monoamide compound of formula (2), so that the resultant homogeneous dispersion is effective for suppressing occurrence of surface defects of the ultimate molded article (which defects function as starting points for creep rupture), and also for suppressing occurrence of by-products (e.g., thermal decomposition products and oxidation products of the polyacetal resin and/or additives).

The polyacetal composition of the present invention may also comprise known additives as long as such additives do not adversely affect the melting temperature of the polyacetal resin. Examples of such additives include an antioxidant, a flame retardant, a colorant, a lubricant, a thermal stabilizer and a rust preventive agent. These additives can be used in amounts such as used for conventional polyacetal resins.

BEST MODE FOR CARRYING OUT THE INVENTION

Hereinbelow, the present invention will be described in more detail with reference to the following Reference Examples, Examples and Comparative Examples, but the examples should not be construed as limiting the scope of the present invention.

In the Reference Examples, Examples and Comparative Examples, various measurements were conducted by the following methods.

(1) Melting Temperature

The melting temperature was measured using a differential scanning calorimetry apparatus (Model DSC7, manufactured and sold by Perkin Elmer Cetus Co., Ltd., U.S.A.). In the measurement, use is made of a specimen prepared by a method in which a polyacetal resin composition was molded into a film by means of a press machine heated at 200° C., and the obtained film was cut so as to obtain a specimen having a weight of 5 mg. The measurement was conducted under temperature change conditions such that the temperature of the atmosphere surrounding the specimen was elevated from 30° C. to 200° C. at a rate of 320° C./min and maintained at 200° C. for 2 minutes, whereupon the temperature was decreased to 130° C. at a rate of 10° C./min, and finally, elevated from 130° C. at a rate of 2.5° C./min. During the final temperature elevation, a heat absorption of the specimen due to the crystallization of the specimen was monitored, and the temperature corresponding to the apex of a peak of the heat absorption was taken as the melting temperature of the specimen.

(2) Number of Samples Suffering Cracking

1) Number of Samples Suffering Cracking Due to a Cooling-Heating Cycle Treatment 10 samples of insert molded articles, each having a morphology as shown in FIGS. 1 and 2, were placed in air, and first heated at 90° C. for 4 hours, and allowed to stand at 23° C. for 2 hours, and subsequently cooled at −20° C. for 4 hours, and finally allowed to stand at 23° C. for 2 hours. This heating-cooling cycle treatment was conducted 100 times. Then, each sample was examined as to whether or not the resin segment has suffered whitening, crazing or cracking (hereinafter, these three phenomena are collectively referred to as "cracking"). When a sample suffered from at least one of the above-mentioned whitening, crazing and cracking, the sample was regarded as having "cracking" (as collectively referred to), and the number of samples having "cracking" among the 10 samples was counted.

2) Number of Samples Suffering Cracking After a Drop Test

Among the 10 samples which had been subjected to the above-mentioned heating-cooling cycle treatment, those which had not suffered "cracking" (as collectively referred to) were then allowed to stand for 24 hours in a room in which the temperature and relative humidity were adjusted to 23° C. and 50%, respectively. Then, each sample was dropped freely to a concrete floor from the height of 3 meters in a manner such that the surface of the sample (as shown in FIGS. 1 and 2) on the side of the metallic segment faced downward. With respect to each dropped sample, the presence or absence of whitening, crazing, and cracking of the resin segment was examined. When a sample had at least one of the above-mentioned whitening, crazing and cracking, the sample was regarded as having "cracking" (as collectively referred to), and the number of samples having "cracking" among the samples subjected to the drop test was counted.

A sum of the number of samples having "cracking" counted in the drop test and the number of samples having "cracking" counted in the preceding test in item 1) above was obtained, and the ratio of the above-obtained sum relative to the 10 samples was given as a criterion for comparison with respect to the cooling-heating cycle resistances including impact resistance.

(3) Cooling-heating Cycle Resistance Test 10 samples of insert molded articles, each having a morphology as shown in FIGS. 1 and 2, were provided. Each sample was placed in air, and first heated at 100° C. for 4 hours, and allowed to stand at 23° C. for 2 hours, and subsequently cooled at −40° C. for 4 hours, and finally allowed to stand at 23° C. for 2 hours. With respect to each of the 10 samples, this heating-cooling cycle was repeated until each sample suffered at least one of the above-mentioned whitening, crazing and cracking. The average cycle number of repeated heating-cooling cycles required for causing "cracking" (as collectively referred to) in the sample was measured with respect to 10 samples.

Abbreviations of various additives used in Examples, Comparative Examples, Table 2 and Table 3 are as follows.
Bisamide Compound
bisamide 1: N,N'-ethylene bisstearamide.
Monoamide Compound
monoamide 1: N,N'-ethylene amine stearamide.
Hindered Phenol Compound
hindered phenol 1: triethylene glycol-bis[3-(3-t-butyl-5-methyl-4-hydroxyphenyl)propionate].
Hindered Amine Compounds
hindered amine 1: bis(2,2,6,6-tetramethyl-4piperidyl)-sebacate, and
hindered amine 2: a condensation product between 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5)undecane]diethanol.
Benzotriazole Compound
benzotriazole 1: 2-[2'-hydroxy-3',5'-bis-(α,α-dimethylbenzyl)phenyl]benzotriazole.
Oxalic Anilide Compound
oxalic anilide 1: 2-ethoxy-2'-ethyl oxalic acid bisanilide.
Polyethylene Glycols
PEG 1: polyethylene glycol having an average molecular weight of about 3,000, and
PEG 2: polyethylene glycol having an average molecular weight of about 6,000.

REFERENCE EXAMPLES 1 to 8

In Reference Examples 1 to 8 individually, highly purified liquid monomers (trioxane and 1,3-dioxolan) and a molecular weight modifier (methylal) were charged into a twin-screw kneader (S2KRC, manufactured and sold by Kurimoto, Ltd., Japan) as a polymerization apparatus, in amounts as shown in Table 1, to thereby obtain a mixture and then, a catalyst (boron fluoride dibutyl ether) in an amount as shown in Table 1 was added thereto, and a bulk polymerization was conducted at 90° C. for about 1 hour. A produced bulk polymer was continuously withdrawn from the polymerization apparatus. Thus, as shown in Table 1, the polyacetal resins POM Nos. 1 to 8 were, respectively, obtained in Reference Examples 1 to 8, wherein POM Nos. 1 to 8 were different in melting temperature due to the differences in monomer ratio used.

EXAMPLES 1 to 16

As shown in Table 2, in Examples 1 to 16, polyacetal resin (POM No. 1, 2, 3, 5 or 8) was used as a base polymer. The base polymer, bisamide 1, monoamide 1, hindered phenol 1 and hindered amine 1 were charged simultaneously in the weight ratio as shown in Table 2, into a twin-screw extruder (PCM-30 mm, manufactured and sold by Ikegami Corporation, Japan) in which the cylinder temperature was at 200° C. The base polymer and the other materials were melt-kneaded in the twin-screw extruder, and a granular polyacetal resin composition was obtained. The obtained granular polyacetal resin composition was subjected to insert molding using an injection molding machine (IS-80A, manufactured and sold by Toshiba Machine Co., Ltd., Japan) to thereby produce an insert molded article as shown in FIGS. 1 and 2 and the properties of the molded article were evaluated. Results are shown in Table 2.

REFERENCE EXAMPLES 9

Substantially the same polymerization as described in Reference Examples 1 to 8 was repeated, except that 1,3-dioxolane was used in an amount, as shown in Table 1, which is smaller than the amounts used in Reference Examples 1 to 8, and that methylal and the catalyst were used in amounts as shown in Table 1, to thereby obtain a polyacetal resin (POM No. 9) having a melting temperature of 163.0° C., which corresponds to the melting temperature of a representative commercially available polyacetal resin.

COMPARATIVE EXAMPLES 1 to 3

In Comparative Examples 1 to 3 individually, production of a molded article was conducted in substantially the same manner as in Examples 1 to 16, except that POM No. 9 was used as a base polymer, and that the base polymer, bisamide 1, monoamide 1, hindered phenol 1 and hindered amine 1 were used in the weight ratio as shown in Table 2, to thereby obtain an insert molded article. The properties of the molded article were evaluated in the same manner as in Examples 1 to 16. Results are shown in Table 2.

COMPARATIVE EXAMPLES 4 to 8

In Comparative Examples 4 to 8 individually, production of a molded article was conducted in substantially the same manner as in Examples 1 to 16, except that, as shown in Table 2, polyacetal resin (POM No. 1 or 2) was used as a base polymer, and that the base polymer, bisamide 1, monoamide 1, hindered phenol 1 and hindered amine 1 were used in the weight ratio as shown in Table 2 wherein the use of some additive(s) was omitted depending on the comparative example, to thereby obtain an insert molded article. The properties of the molded article were evaluated in the same manner as in Examples 1 to 16. Results are shown in Table 2.

EXAMPLES 17 to 35

In Examples 17 to 35 individually, production of a molded article was conducted in substantially the same manner as in Examples 1 to 16, except that, as shown in Table 3, polyacetal resin (POM No. 1, 2, 4, 6, 7 or 8) was used as a base polymer, and that the base polymer, bisamide 1, monoamide 1, hindered amine 1, hindered amine 2, benzotriazole 1, oxalic anilide 1, PEG 1 and PEG 2 were used in the weight ratio as shown in Table 3, to thereby obtain an insert molded article. The obtained molded article was subjected to a cooling-heating cycle resistance test as mentioned above. Results are shown in Table 3.

COMPARATIVE EXAMPLES 9 and 10

In Comparative Examples 9 and 10 individually, production of a molded article was conducted in substantially the same manner as in Examples 1 to 16, except that POM No. 9 was used as a base polymer, and that the base polymer, bisamide 1, monoamide 1, hindered amine 1, hindered amine 2, benzotriazole 1, oxalic anilide 1, PEG 1 and PEG 2 were used in the weight ratio as shown in Table 3, to thereby obtain an insert molded article. The obtained molded article was subjected to a cooling-heating cycle resistance test as mentioned above. Results are shown in Table 3.

COMPARATIVE EXAMPLES 11 to 14

In Comparative Examples 11 to 14 individually, production of a molded article was conducted in substantially the same manner as in Examples 1 to 16, except that POM No. 2 was used as a base polymer, and that the base polymer, bisamide 1, monoamide 1, hindered amine 1, hindered amine 2, benzotriazole 1, oxalic anilide 1, PEG 1 and PEG 2 were used in the weight ratio as shown in Table 3 wherein the use of some additive(s) was omitted depending on the comparative example, to thereby obtain an insert molded article. The obtained molded article was subjected to a cooling-heating cycle resistance test as mentioned above. Results are shown in Table 3.

TABLE 1

|  | POM No. | Amount of 1,3-dioxolane (mol %)* | Amount of methylal (mol %)* | Amount of catalyst (mol %)* | Melting temperature (° C.) |
|---|---|---|---|---|---|
| Reference Example 1 | POM1 | 5.0 | 0.1 | 0.002 | 161 |
| Reference Example 2 | POM2 | 6.0 | 0.1 | 0.002 | 160 |
| Reference Example 3 | POM3 | 8.0 | 0.1 | 0.002 | 158 |
| Reference Example 4 | POM4 | 10.0 | 0.1 | 0.002 | 157 |
| Reference Example 5 | POM5 | 12.0 | 0.1 | 0.002 | 155 |
| Reference Example 6 | POM6 | 15.0 | 0.1 | 0.002 | 154 |
| Reference Example 7 | POM7 | 19.0 | 0.1 | 0.002 | 151 |
| Reference Example 8 | POM8 | 22.0 | 0.1 | 0.002 | 150 |
| Reference Example 9 | POM9 | 4.2 | 0.1 | 0.002 | 163 |

*based on the molar amount of trioxane

TABLE 2

|  | POM No. | Melting temperature (° C.) | Composition (phr) | | | | Number of samples suffering cracking after cooling-heating cycles Cooling heating cycle treatment only | Number of tested samples Cooling-heating cyle treatment plus a drop test** |
|---|---|---|---|---|---|---|---|---|
|  |  |  | Bisamide 1 | Monoamide 1 | Hindered phenol 1 | Hindered amine 1 |  |  |
| Example 1 | POM 1 | 161 | 0.20 | 0.02 | 0.00 | 0.00 | 0/10 | 2/10 |
| Example 2 | POM 2 | 160 | 0.20 | 0.02 | 0.00 | 0.00 | 0/10 | 2/10 |
| Example 3 | POM 3 | 158 | 0.20 | 0.02 | 0.00 | 0.00 | 0/10 | 1/10 |
| Example 4 | POM 5 | 155 | 0.20 | 0.02 | 0.00 | 0.00 | 0/10 | 0/10 |
| Example 5 | POM 8 | 150 | 0.20 | 0.02 | 0.00 | 0.00 | 0/10 | 0/10 |
| Example 6 | POM 2 | 160 | 0.01 | 0.02 | 0.00 | 0.00 | 0/10 | 3/10 |
| Example 7 | POM 2 | 160 | 0.05 | 0.02 | 0.00 | 0.00 | 0/10 | 2/10 |
| Example 8 | POM 2 | 160 | 5.00 | 0.02 | 0.00 | 0.00 | 0/10 | 2/10 |
| Example 9 | POM 2 | 160 | 0.20 | 0.0001 | 0.00 | 0.00 | 0/10 | 2/10 |
| Example 10 | POM 2 | 160 | 0.20 | 5.00 | 0.00 | 0.00 | 0/10 | 2/10 |
| Example 11 | POM 2 | 160 | 0.20 | 0.02 | 0.01 | 0.00 | 0/10 | 1/10 |
| Example 12 | POM 2 | 160 | 0.20 | 0.02 | 0.20 | 0.00 | 0/10 | 0/10 |
| Example 13 | POM 2 | 160 | 0.20 | 0.02 | 5.00 | 0.00 | 0/10 | 1/10 |
| Example 14 | POM 2 | 160 | 0.20 | 0.02 | 0.00 | 0.01 | 0/10 | 1/10 |
| Example 15 | POM 2 | 160 | 0.20 | 0.02 | 0.00 | 0.40 | 0/10 | 0/10 |
| Example 16 | POM 2 | 160 | 0.20 | 0.02 | 0.00 | 5.00 | 0/10 | 1/10 |
| Comparative Example 1 | POM 9 | 163 | 0.20 | 0.00 | 0.00 | 0.00 | 6/10 | 9/10 |
| Comparative Example 2 | POM 9 | 163 | 0.20 | 0.02 | 0.00 | 0.00 | 5/10 | 8/10 |

TABLE 2-continued

|  | POM No. | Melting temperature (° C.) | Composition (phr) Bis-amide 1 | Mono-amide 1 | Hindered phenol 1 | Hindered amine 1 | Number of samples suffering cracking after cooling-heating cycles Cooling heating cycle treatment only | Number of tested samples Cooling-heating cyle treatment plus a drop test** |
|---|---|---|---|---|---|---|---|---|
| Comparative Example 3 | POM 9 | 163 | 0.20 | 0.02 | 2.00 | 0.40 | 5/10 | 8/10 |
| Comparative Example 4 | POM 2 | 160 | 0.00 | 0.02 | 0.00 | 0.00 | 5/10 | 7/10 |
| Comparative Example 5 | POM 1 | 161 | 0.20 | 0 | 0.00 | 0.00 | 1/10 | 5/10 |
| Comparative Example 6 | POM 2 | 160 | 0.20 | 0 | 0.20 | 0.40 | 0/10 | 4/10 |
| Comparative Example 7 | POM 2 | 160 | 0.00 | 0.02 | 2.00 | 0.40 | 5/10 | 6/10 |
| Comparative Example 8 | POM 2 | 160 | 6.00 | 0.02 | 2.00 | 0.40 | 2/10 | 4/10 |

*phr = part(s) per hundred parts by weight of polyacetal resin
**($N_1$ + $N_2$)/Number of tested samples (= 10) wherein $N_1$ is the number of samples suffering "cracking" (among the 10 samples) by the cooling-heating cycle treatment only, and $N_2$ is the number of samples suffering "cracking" (among the samples which had not surffered "cracking" by the preceding cooling-heating cycle treatment) by the drop test.

TABLE 3

|  | POM No. | Melting temperature (° C.) | Composition (phr)* Bis-amide 1 | Mono-amide 1 | Hindered amine 1 | Hindered amine 2 | Benzotriazole 1 | Oxalic anilide 1 | PEG 1 | PEG 2 | Number of cooling heating cycles |
|---|---|---|---|---|---|---|---|---|---|---|---|
| Example 17 | POM 2 | 160 | 0.1 | 0.02 | 0.25 | 0 | 0.50 | 0 | 0 | 0 | 124 |
| Example 18 | POM 2 | 160 | 0.1 | 0.02 | 0.25 | 0 | 0 | 0.50 | 0 | 0 | 125 |
| Example 19 | POM 2 | 160 | 0.1 | 0.02 | 0.25 | 0.25 | 0.50 | 0 | 1 | 0 | 132 |
| Example 20 | POM 2 | 160 | 0.1 | 0.02 | 0.25 | 0.25 | 0.50 | 0 | 0 | 1 | 133 |
| Example 21 | POM 4 | 157 | 0.1 | 0.02 | 0.25 | 0 | 0.50 | 0 | 0 | 0 | 123 |
| Example 22 | POM 4 | 157 | 0.1 | 0.02 | 0.25 | 0 | 0.50 | 0 | 1 | 0 | 131 |
| Example 23 | POM 6 | 154 | 0.1 | 0.02 | 0.25 | 0 | 0.50 | 0 | 0 | 0 | 127 |
| Example 24 | POM 6 | 154 | 0.1 | 0.02 | 0.25 | 0 | 0 | 0.50 | 0 | 0 | 126 |
| Example 25 | POM 6 | 154 | 0.1 | 0.02 | 0.25 | 0.25 | 0.50 | 0 | 0 | 1 | 134 |
| Example 26 | POM 7 | 151 | 0.1 | 0.02 | 0.25 | 0 | 0.50 | 0 | 0 | 0 | 127 |
| Example 27 | POM 7 | 151 | 0.1 | 0.02 | 0.25 | 0.25 | 0.50 | 0 | 1 | 0 | 136 |
| Example 28 | POM 1 | 161 | 0.1 | 0.02 | 0.25 | 0 | 0.50 | 0 | 0 | 0 | 123 |
| Example 29 | POM 8 | 150 | 0.1 | 0.02 | 0.25 | 0 | 0.50 | 0 | 0 | 0 | 126 |
| Example 30 | POM 2 | 160 | 0.1 | 0.02 | 0.25 | 0 | 0.25 | 0 | 0 | 0 | 122 |
| Example 31 | POM 2 | 160 | 0.1 | 0.02 | 0.50 | 0.50 | 1 | 0 | 0 | 1 | 133 |
| Example 32 | POM 2 | 160 | 0.05 | 0.02 | 0.25 | 0 | 0.50 | 0 | 0 | 0 | 121 |
| Example 33 | POM 2 | 160 | 1 | 0.02 | 0.25 | 0 | 0.50 | 0 | 0 | 0 | 123 |
| Example 34 | POM 2 | 160 | 0.1 | 0.02 | 0.25 | 0.25 | 0.50 | 0 | 0 | 0.02 | 132 |
| Example 35 | POM 2 | 160 | 0.1 | 0.02 | 0.25 | 0.25 | 0.50 | 0 | 0 | 2 | 135 |
| Comparative Example 9 | POM 9 | 163 | 0.1 | 0.02 | 0.25 | 0 | 0.50 | 0 | 0 | 0 | 92 |
| Comparative Example 10 | POM 9 | 163 | 0.1 | 0.02 | 0.25 | 0.25 | 0.50 | 0 | 0 | 1 | 94 |
| Comparative Example 11 | POM 2 | 160 | 0 | 0.02 | 0.25 | 0 | 0.50 | 0 | 0 | 0 | 98 |
| Comparative Example 12 | POM 2 | 160 | 0 | 0.02 | 0.25 | 0.25 | 0.50 | 0 | 0 | 1 | 95 |
| Comparative Example 13 | POM 2 | 160 | 0.1 | 0 | 0 | 0 | 0 | 0 | 0 | 0 | 63 |
| Comparative Example 14 | POM 2 | 160 | 0.1 | 0 | 0 | 0 | 0 | 0 | 0 | 1 | 65 |

*phr = part(s) per hundred parts by weight of polyacetal resin

INDUSTRIAL APPLICABILITY

The polyacetal resin composition of the present invention has excellent weatherability, specifically excellent resistance to cooling-heating cycles, i.e., mechanical strength retentivity during cooling-heating cycles. For example, in the polyacetal resin composition of the present invention, not only the occurrence of whitening, crazing or cracking but also the lowering in impact resistance can be suppressed even after the polyacetal resin composition experiences repeated cooling-heating cycles. Therefore, the polyacetal resin composition can be advantageously used in various applications where repeated heating-cooling cycles are necessarily experienced, for which the use of conventional polyacetal resins has been restricted. Furthermore, an insert molded article, comprising the above-mentioned polyacetal resin composition and a shaped part unified with the resin composition by insert molding, also exhibits excellent cooling-heating cycle resistance with respect to the mechanical strength, so that, even after the insert molded article experiences repeated cooling-heating cycles, it does not suffer either appearance deterioration, such as whitening due to fine crazing, or a lowering in impact resistance. Thus, the insert molded article of the present invention can be used for a prolonged period of time, without suffering crazing or cracking.

We claim:

1. A polyacetal resin composition comprising:
   100 parts by weight of a polyacetal resin having a melting temperature of from 150 to 161° C.,
   0.01 to 5.0 parts by weight, relative to 100 parts by weight of said polyacetal resin, of at least one bisamide compound represented by the following formula (1):

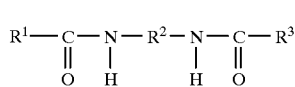

(1)

wherein each of $R^1$ and $R^3$ independently represents a $C_1$–$C_{30}$ alkyl group or a $C_2$–$C_{30}$ alkenyl group, and $R^2$ represents a $C_2$–$C_{10}$ alkylene group, a $C_2$–$C_{10}$ alkenylene group, or a group represented by formula —$R^4$—Ph—$R^5$—, wherein each of $R^4$ and $R^5$ independently represents a single bond or a methylene group, and Ph represents a phenylene group, and 0.0001 to 5.0 parts by weight, relative to 100 parts by weight of the polyacetal resin, of at least one monoamide compound represented by the following formula (2):

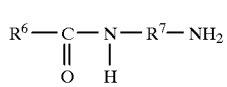

(2)

wherein $R^6$ represents a $C_1$–$C_{30}$ alkyl group or a $C_2$–$C_{30}$ alkenyl group, and $R^7$ represents a $C_2$–$C_{10}$ alkylene group, a $C_2$–$C_{10}$ alkenylene group, or a group represented by formula —$R^8$—Ph—$R^9$—, wherein each of $R^8$ and $R^9$ independently represents a single bond or a methylene group, and Ph represents a phenylene group.

2. The resin composition according to claim 1, which further comprises 0.01 to 5.0 parts by weight, relative to 100 parts by weight of said polyacetal resin, of at least one hindered phenol compound.

3. The resin composition according to claim 1, which further comprises 0.01 to 5.0 parts by weight, relative to 100 parts by weight of said polyacetal resin, of at least one hindered amine compound.

4. The resin composition according to claim 1, which further comprises 0.01 to 5.0 parts by weight, relative to 100 parts by weight of said polyacetal resin, of at least one compound selected from the group consisting of benzotriazole compounds and oxalic anilide compounds.

5. The resin composition according to claim 4, which further comprises 0.01 to 3.0 parts by weight, relative to 100 parts by weight of said polyacetal resin, of at least one polyalkylene glycol represented by the following formula (3):

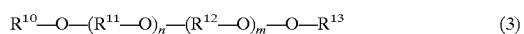

(3)

wherein each of $R^{10}$ and $R^{13}$ independently represents a hydrogen atom, a $C_1$–$C_{30}$ alkyl group, a $C_2$–$C_{30}$ alkenyl group, a $C_1$–$C_{30}$ acyl group or a $C_7$–$C_{30}$ alkylphenyl group, each of $R^{11}$ and $R^{12}$ independently represents a $C_2$–$C_6$ alkylene group, and each of n and m independently represents an integer of 1 or more with the proviso that n+m<1,000.

6. An insert molded article comprising a polyacetal resin composition according to claim 1 and a shaped part unified with said resin composition by insert molding.

* * * * *